United States Patent [19]

Bobar et al.

[11] Patent Number: 4,983,760

[45] Date of Patent: Jan. 8, 1991

[54] LOW MOLECULAR WEIGHT POLYMERS OF ACRYLIC ESTERS

[75] Inventors: Georg Bobar, Bad Durkheim; Klaus Schnell, Ludwigshafen; Gerd Schroeder, Limburgerhof; Eckehardt Wistuba, Bad Durkheim, all of Fed. Rep. of Germany

[73] Assignee: BASF Aktiengesellschaft, Ludwigshafen, Fed. Rep. of Germany

[21] Appl. No.: 461,744

[22] Filed: Jan. 8, 1990

[30] Foreign Application Priority Data

Jan. 27, 1989 [DE] Fed. Rep. of Germany ....... 3902440

[51] Int. Cl.$^5$ ................................ C07C 69/34
[52] U.S. Cl. ...................... 560/190; 560/205
[58] Field of Search ................. 560/190, 205

[56] References Cited

U.S. PATENT DOCUMENTS 4,075,242  2/1978  Rhum et al. ................ 560/190

FOREIGN PATENT DOCUMENTS 52-155691  5/1977  Japan .
188007   11/1966  U.S.S.R. .

Primary Examiner—Paul J. Killos
Attorney, Agent, or Firm—Oblon, Spivak, McClelland, Maier & Neustadt

[57] ABSTRACT

Low molecular weight polymers of acrylic esters which are suitable for use as external plasticizers in coated compositions on a synthetic resin basis are obtainable by subjecting (a) from 80 to 100% by weight of at least one acrylic ester of $C_1$–$C_8$-alkanol (monomer I) and (b) 0 to 20% by weight of one or more other copolymerizable monomers (monomer II)

to a free radical polymerization in a solution in isopropanol in a pressure vessel at 130°–140° C. by introducing first from 70 to 95% by weight of a solvent and adding the remainder of the polymerization batch continuously over 3-7 hours in separate portions of which one contains the monomers and, after the polymerization has ended, distilling off the solvent under reduced pressure, the weight proportion of solvent being 5-15% by weight based on the monomers, the weight proportion of initiator being 0.5-3% by weight based on the monomers, and the half-life of the initiator at the polymerization temperature being from 10 seconds to 3 hours.

1 Claim, No Drawings

LOW MOLECULAR WEIGHT POLYMERS OF ACRYLIC ESTERS

The present invention relates to a low molecular weight polymer of one or more acrylic esters, which is obtainable by subjecting
   (a) from 80 to 100% by weight of at least one acrylic ester of $C_1$–$C_8$-alkanol (monomer I) and
   (b) 0 to 20% by weight of one or more other copolymerizable monomers (monomer II)
to a free radical polymerization in a solution in isopropanol in a pressure vessel at 130° C.–140° C. by introducing first from 70 to 95% by weight of a solvent and adding the remainder of the polymerization batch continuously over 3–7 hours in separate portions of which one contains the monomers and, after the polymerization has ended, distilling off the solvent under reduced pressure, the weight proportion of solvent being 5–15% by weight based on the monomers, the weight proportion of initiator being 0.5–3% by weight based on the monomers, and the half-life of the initiator at the polymerization temperature being from 10 seconds to 3 hours.

The present invention further relates to the preparation of these low molecular weight polymers and to the use thereof as external plasticizers.

It is common knowledge that the free radical polymerization in solution can produce polymers of low molecular weight if major amounts of polymerization initiators or molecular weight regulators such as mercaptans are added or the solvent used acts as a molecular weight regulator. In general, however, fragments of these initiators or molecular weight regulators become chemically incorporated in the polymer where they usually impair the properties of the polymer or cause it to fail purity and (absence of) odor requirements.

U.S. Pat. No. 4,075,242 and JP Pat. No. 52-155,691 concern processes for preparing low molecular weight polymers of acrylic esters, wherein the polymerization is carried out in high boiling organic solvents at above 150° C. As has been ascertained, the thermal stress of a complete distillative removal of these high boiling solvents causes the polymers to discolor, which is frequently a disadvantage if they are used as external plasticizers. In addition, higher polymerization temperatures usually lead to undesirably wide molecular weight distributions.

SU No. 931,188 concerns a process for preparing solvent-free, colorless and odorless low molecular weight polyacrylates, wherein isopropanol is used as solvent under reflux (79°–89° C.) in excess, based on the monomers It transpires that the polyacrylates obtainable by this process are indeed colorless, but they are not odorless. The odor is presumably due to the proportion of oligomer formed.

It is an object of the present invention to make available low molecular weight polymers of acrylic esters free of these defects and suitable in particular for use as external plasticizers.

We have found that this object is achieved by the polymer defined at the beginning, the implicitly defined process for preparing same, and the use thereof as external plasticizer.

Monomer I is advantageously an ester of acrylic acid derived from ethanol, isopropanol, n-butanol, isobutanol, n-hexanol or 2-ethylhexanol, of which the esters of n-butanol and 2-ethylhexanol are particularly preferred.

Monomer II is in particular an ester of methacrylic acid derived from an alkanol of from 1 to 8 carbon atoms, a vinyl ester of alkanoic acid of from 2 to 6 carbon atoms or aromatic vinyl monomer such as styrene. Preferred methacrylic esters are methyl methacrylate and n-butyl methacrylate, while preferred vinyl esters are vinyl acetate and vinyl propionate. If mixtures of monomers I and monomers II are used, the composition is advantageously chosen in such a way that a polymer composed of these monomers has a glass transition temperature $T_g$ of from $-65°$ to $-20°$ C. According to Fox, (T. G. Fox, Bull. Am. Phys. Soc. (Ser.II) 1, (1956) 123), the glass transition temperature of copolymers is given to a good approximation by:

$$\frac{1}{T_g} = \frac{x^1}{T_g^1} + \frac{x^2}{T_g^2} + \ldots \frac{x^n}{T_g^n}$$

where $x^1, x^2, \ldots, x^n$ are the mass fractions of monomers 1, 2, ..., n and $T_g^1 T_g^2 \ldots T_g^n$ are the glass transition temperatures in kelvin of the polymers composed of only one of the monomers 1, 2, ... or n. The glass transition temperatures of these homopolymers of the above-recited monomers I and II are known and are given for example in J. Brandrup, E. H. Immergut, Polymer Handbook 1st Ed. J. Wiley, New York 1966 and 2nd Ed. J. Wiley, New York 1975. However, preference is given to polymers of a $T_g$ of $-65°$ to $-20°$ C. composed only of monomers I, of which the homopolymers of n-butyl acrylate and of 2-ethylhexyl acrylate are particularly preferred.

Besides isopropanol the polymerization medium may contain up to 5% by weight of a liquid which is miscible with isopropanol, for example another lower alcohol such as tert-butanol. Preferably, however, pure isopropanol is used. The total amount of solvent used is from 5 to 15, preferably from 8 to 12% by weight based on the monomers.

The initiator used can be any which is sufficiently soluble or liquid in the reaction medium and the half-life of which at the polymerization temperature is from 10 seconds to 3 hours. Particularly suitably initiators are tert-butyl per-2-ethylhexanoate, tert-butyl perbenzoate, 2,5-dimethyl-2,5-di-tert-butylperoxihexane, di-tert-butyl peroxide and azobis(isobutyronitrile).

The amount of initiator used is from 0.5 to 3% by weight, based on the monomers. Initiators which decompose rapidly at the polymerization temperature are preferably added in amounts nearer the lower limit of the range (for example tert-butyl per-2-ethylhexanoate in amounts of from 0.5–1% by weight) and initiators which decompose slowly at the polymerization temperature are preferably added in amounts nearer the upper limit of the range (for example di-tert-butyl peroxide in amounts of 2 to 3% by weight). It is particularly advantageous to use mixtures of different initiators, especially mixtures of relatively rapidly and relatively slowly decomposing initiators, since their use generally gives polymers having a particularly low residue monomer content.

The free radical solution polymerization is carried out in a pressure vessel in the form of an addition process. From 70 to 95% by weight, preferably from 85 to 90% by weight, of the solvent are introduced first and then heated to the polymerization temperature of from 130° to 140° C., and then, while the polymerization temperature is maintained, preferably at 135° C., the remainder of the polymerization batch is added continuously in the course of from 3 to 7 hours in separate portions, one of which contains the monomers. The monomer mixture is preferably added in pure form, while the initiators are preferably added dissolved in the remaining amount of solvent. Essentially, the monomers and the initiators are added synchronously. However, from the aspect of a particularly low level of residual monomer, it is of advantage to control the addition of the initiators in such a way that it takes about 20–40 minutes longer than the addition of the monomers. It is also of advantage to maintain the polymerization temperature at a constant 135° C. To complete the conversion, the polymerization mixture is advantageously left to polymerize for a further 1–2 hours after the addition has ended. The mixture is then cooled down and the solvent is distilled off under reduced pressure in a conventional manner. It is of advantage here that, based on the amount of monomers, less solvent is required in the process according to the present invention than in the process of SU No. 931,188. The polymers thus obtainable, which are liquid under standard conditions, are solvent-free, odorless and also colorless and transparent. Their weight average molecular weight $\overline{M}_w$ determined by gel permeation chromatography (calibrating substance: linear polystyrene) is from 7,500 to 30,000, the associated polymolecularity index Q being 1.5 to 3.0. Q is the ratio of the weight average molecular weight $\overline{M}_w$ to the number average molecular weight $\overline{M}_n$ and is a measure of the width of the molecular weight distribution. In addition, the polymers according to the present invention are particularly low in oligomer. The weight proportion G of molecules having a molecular weight of below 500 is less than 0.5% by weight. The dynamic viscosities of the polymers according to the present invention are comparatively low, ranging at 23° C. from 10 to 60 Pa.s (determined by German Standard Specification DIN 53019 at a shear gradient 150 s$^{-1}$ using a rotary viscosimeter of the Searle type). These comparatively low viscosities are inter alia due to the fact that, under the reaction conditions described, non-monomeric units are incorporated into the polymers only to a minor extent, the result being particularly low end group polymers which for example have low acid and hydroxyl numbers. The acid number indicates the amount of KOH in mg required to neutralize the acid functions present in 1 g of polymer, and the hydroxyl number indicates the amount of KOH in mg which is equivalent to the amount of acetic acid bonded in the acetylation of 1 g of polymer.

The polymers according to the present invention are versatile external plasticizers which are highly compatible (homogenously miscible) with many other polymers. Owing to hydrolysis resistance, low volatility, light fastness, water fastness, weather resistance, low migration tendency coupled with low intrinsic viscosity and the pronounced binding capacity of their own, the polymers according to the present invention are preferably used as plasticizers in coating compositions on a synthetic resin basis which contain other polymers in solid form, in solution or in disperse form as binders. Examples of such coating compositions are surface coatings and inks. The polymers according to the present invention can also be used as plasticizers in sealing compositions, adhesives or other plastics formulations, for example extrudable composite materials.

EXAMPLES

EXAMPLE 1

Preparation of low molecular weight poly-n-butyl acrylate

In a pressure vessel 2 kg of isopropanol were heated to 135° C. and then admixed at that temperature by stirring with 20 kg of n-butyl acrylate added over 5 hours. At the same time as the monomer a solution of 76.6 g of tert-butyl per-2-ethylhexanoate and 76.6 g of di-tert-butyl peroxide in 405.4 g of isopropanol was added over a period of 5 hours and 15 minutes. After the addition had ended, the polymerization was continued for a further 2 hours. The solvent was then separated off by vacuum distillation. Table 1 indicates the properties of the poly-n-butyl acrylate E1 obtained. In addition to the values of $\overline{M}_w$, Q and G determined by gel permeation chromatography, Table 1 shows the molecular weight $\overline{M}$ determined cryoscopically in naphthalene. Table 1 also shows the properties of two poly-n-butyl methacrylates C1 and C2 prepared for comparison. C1 was prepared in accordance with Example 1 of SU No. 931,188, except that n-butyl acrylate was used as monomer, and C2 corresponds to Example 2 of SU No. 931,188.

TABLE 1

|  | E1 | C1 | C2 |
| --- | --- | --- | --- |
| $\overline{M}$ | 2820 | 2660 | 2760 |
| $\overline{M}_w$ | 14238 | 13278 | 17462 |
| Q | 2.56 | 2.67 | 3.31 |
| G | 0.428 | 1.26 | 1.33 |
| Viscosity | 19 Pa · s | | |
| Acid number | 0.1 | | |
| Hydroxyl number | 7 | | |

EXAMPLE 2

Test of compatibility between various binder polymers and E1.

The compatibility test was carried out in line with German Standard Specification DIN No. 55954. The binders under test for compatibility, which had a weight average molecular weight of 30,000 to 80,000, were dissolved together with E1 in a weight ratio of binder:E1=75:25 in various solvents (total solids content of the solutions=35% by weight), and these solutions were applied to glass plates in a wet film thickness of 0.2 mm. The coated glass plates were then dried under standard conditions (23° C., 50% relative humidity) for 28 days and then at 50° C. at 50% relative humidity for 24 hours. Compatibility was judged by the cloudiness of the films formed on drying. The results are shown in Table 2.

TABLE 2

| Binder composed of | Solvent | Compatibility |
| --- | --- | --- |
| (A) 75% by wt. of vinyl chloride<br>25% by wt. of vinyl isobutyl ether | xylene as per DIN 51633 | homogeneously miscible |
| (B) 35% by wt. of isobutyl metacrylate<br>27% by wt. of tert-butyl acrylate<br>30% by wt. of styrene<br>8% by wt. of lauryl acrylate | naphtha as per DIN 51632 | homogeneously miscible |
| (C) 70% by wt. of styrene<br>20% by wt. of isobutyl | xylene as per DIN 51633 | homogeneously miscible |

TABLE 2-continued

| Binder composed of | Solvent | Compatibility |
|---|---|---|
| acrylate 5% by wt. of acrylic acid 5% by wt. of n-butyl acrylate | and n-butanol in a wt. ratio of 9:1 | |
| (D) 70% by wt. of vinyl chloride 29% by wt. of vinyl propionate | n-butyl acetate | homogeneously miscible |

EXAMPLE 3

Investigation of the plasticizing effect of E1

This investigation was carried out in line with German Standard Specification DIN No. 53157. Binders (A) to (D) of Example 2 and polymer E1 were dissolved in various weight ratios in the same solvents as in Example 2 (total solids content of the solutions=35% by weight), and the solutions were applied in film form in the same way as in Example 2. Thereafter the damping characteristics of the resulting synthetic resin films were determined using a König pendulum instrument (German Standard Specification DIN No. 53157).

Table 3 shows the times t required for the first pendulum deflection equal to or less than 3°.

TABLE 3

| Binder | Weight ratio (binder:E1) | t(sec) |
|---|---|---|
| A | 10:0 | 189 |
|   | 9:1 | 174 |
|   | 8:2 | 150 |
|   | 7:3 | 106 |
| B | 10:0 | 158 |
|   | 9:1 | 133 |
|   | 8:2 | 92 |
|   | 7:3 | 55 |
| C | 10:0 | 192 |
|   | 9:1 | 186 |
|   | 8:2 | 169 |
|   | 7:3 | 140 |
| D | 10:0 | 195 |
|   | 9:1 | 178 |
|   | 8:2 | 157 |
|   | 7:3 | 116 |

We claim:

1. A low molecular weight polymer of one or more acrylic esters, obtainable by subjecting
   (a) from 80 to 100% by weight of at least one acrylic ester of $C_1$-$C_8$-alkanol (monomer I) and
   (b) 0 to 20% by weight of one or more other copolymerizable monomers (monomer II)

to a free radical polymerization in a solution in isopropanol in a pressure vessel at 130°-140° C. by introducing first from 70 to 95% by weight of a solvent and adding the remainder of the polymerization batch continuously over 3-7 hours in separate portions of which one contains the monomers and, after the polymerization has ended, distilling off the solvent under reduced pressure, the weight proportion of solvent being 5-15% by weight based on the monomers, the weight proportion of initiator being 0.5-3% by weight based on the monomers, and the half-life of the initiator at the polymerization temperature being from 10 seconds to 3 hours.

* * * * *